A. H. CROCKFORD
Bit-Clamps.
No. 206,006.   Patented July 16, 1878.
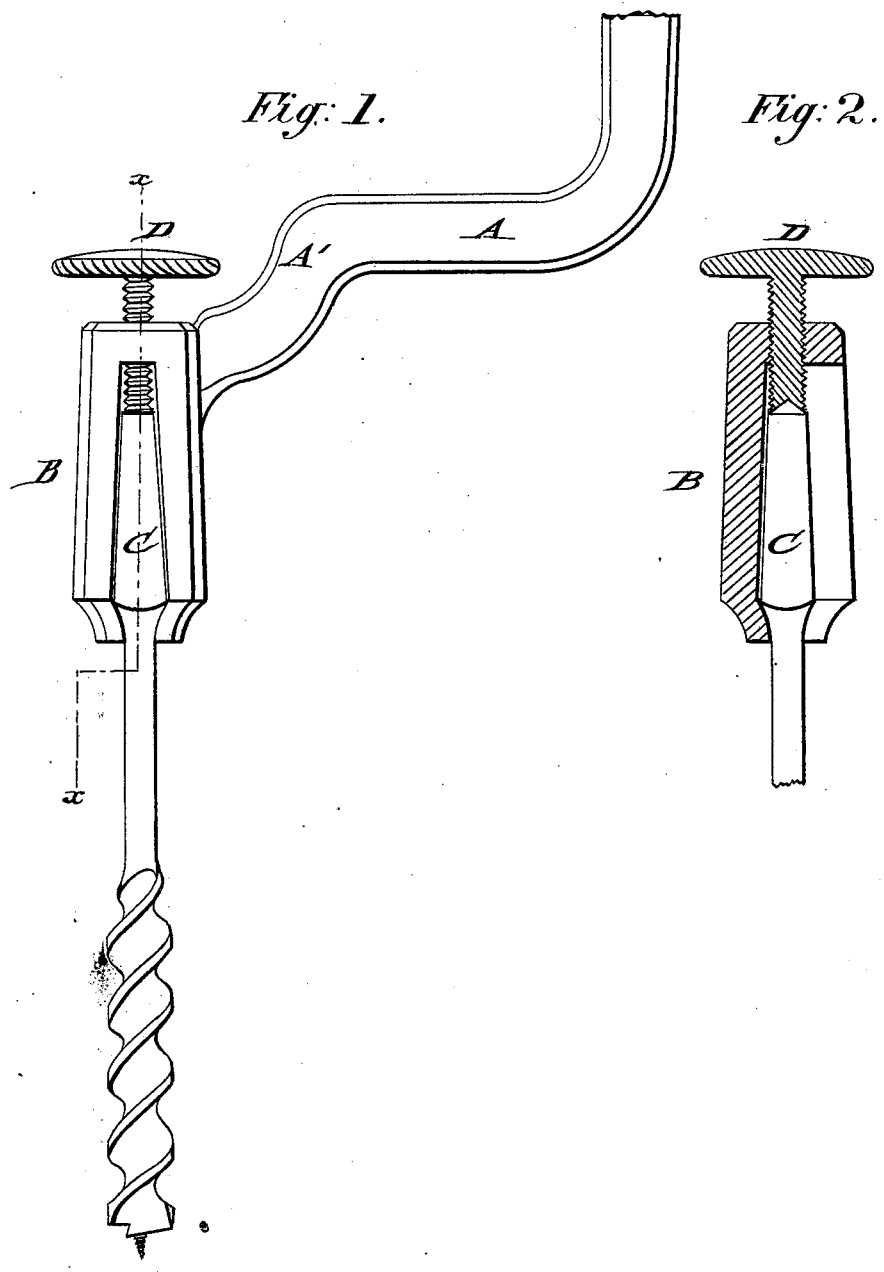
WITNESSES:
Achilles Schehl
C. Sedgwick
INVENTOR:
A. H. Crockford
BY Munn & Co
ATTORNEYS.

UNITED STATES PATENT OFFICE.

ALFRED H. CROCKFORD, OF NEWARK, NEW JERSEY.

IMPROVEMENT IN BIT-CLAMPS.

Specification forming part of Letters Patent No. 206,006, dated July 16, 1878; application filed May 2, 1878.

*To all whom it may concern:*

Be it known that I, ALFRED H. CROCKFORD, of Newark, in the county of Essex and State of New Jersey, have invented a new and Improved Bit-Clamp, of which the following is a specification:

In the accompanying drawing, Figure 1 represents a side elevation of my improved bit-clamp, and Fig. 2 a vertical transverse section of the same on line $x$ $x$, Fig. 1.

Similar letters of reference indicate corresponding parts.

This invention has for its object to furnish for augers and drills an improved bit-clamp, by which the bits may be centered and firmly clamped in simple and reliable manner; and the invention consists of a socket that is open at one side, and provided with an interior recess corresponding to the enlarged end of the bit-shank, which is clamped by a centering-screw at the upper end of the socket, so as to bear by a conical bottom recess on the conically-tapering end of the shank. An angular offset in the handle of the stock prevents the contact of the hand with the clamping and centering screw.

Referring to the drawing, A represents the stock of an auger or drill, and B the socket for the enlarged end C of the shank of the auger or other bit. The socket B is made open at one side and recessed at the interior, so as to correspond in shape and taper to the shoulder and tapering portion of the enlarged shank end C. This shank end fits thereby readily into the socket when inserted through the side recess, and may be quickly clamped and simultaneously centered by a screw, D, with milled head, that passes through the center of the top of the socket into the same, and bears, by its conically-recessed lower end, on the conically-tapering end of the shank. The shank of the bit is thereby axially centered in the socket and rigidly secured therein without the use of jaws and similar mechanism.

The auger or drill stock is provided with an angular offset, A', that extends above the head of the center clamp-screw, so as to bring the hand that takes hold of the stock clear above the clamp-screw. The bits may by the use of this socket-clamp be quickly exchanged and firmly clamped in superior and reliable manner.

Having thus described my invention, I claim as new and desire to secure by Letters Patent—

1. The combination of the socket of an auger or drill stock, being open at one side and recessed to correspond with the enlarged shank end of the bit, with the shank end and a centering top clamp-screw of the socket bearing on the conically-tapering end of the shank, substantially as and for the purpose set forth.

2. The combination, in a bit-clamp, of the auger or drill stock having a side-recessed socket and centering clamp-screw for the shank end of the bit, with an angular offset that extends above the head of the clamp-screw, substantially as set forth.

ALFRED H. CROCKFORD.

Witnesses:
 PAUL GOEPEL,
 C. SEDGWICK.